May 30, 1939.    J. J. VEILLETTE    2,160,374
SELF-PIERCING STUD ASSEMBLY
Filed Aug. 25, 1937

INVENTOR
Jeffery J. Veillette,
BY
Fraser, Myers & Mawley
ATTORNEYS

Patented May 30, 1939

2,160,374

UNITED STATES PATENT OFFICE 2,160,374

SELF-PIERCING STUD ASSEMBLY

Jeffery J. Veillette, Waterbury, Conn., assignor to Scovill Manufacturing Company, Waterbury, Conn., a corporation of Connecticut Application August 25, 1937, Serial No. 160,731

8 Claims. (Cl. 24—219)

This invention relates to improvements in the method of and means for riveting an appropriate article to a flexible supporting sheet, and while it may be used for securing such article to almost any kind of material, its novel features make it particularly useful when that material is rubber or has similar characteristics. For that reason the invention is here shown and particularly described in connection with the attachment of an article such as a fastener stud member to an elastic sheet.

The principal object of the invention is to provide for the piercing of a supporting sheet, even a relatively thick one made of such highly elastic material as rubber, during the operation wherein an article such as a separable fastener stud shell is attached thereto; and more specifically, to provide an improved attaching rivet having certain projecting parts which are capable of cooperating with surfaces of the stud shell, when telescoped within the latter element in a more or less conventional way, to pierce an intervening supporting sheet at one or more points.

It is a further object of the invention to provide a rivet having a base flange, and a central upstanding post with one or more thin, knife-like wings extending radially from its cylindrical surfaces near its upper end so as to be capable of slitting that part of an intervening supporting sheet which is stretched over its sides during the attaching operation in the general manner set forth in the immediately foregoing object.

Another and more specific object of the invention resides in the provision of an attaching rivet having a tubular post with an axially flattened tip of such dimension that, when telescoped within the head of a stud shell, its thin side edges act as knives in slitting the intervening sheet material in the manner above pointed out, and its flat sides are so spaced from the adjacent walls of the shell as to leave adequate room for the withdrawal of the remaining part of the sheet from the head of the rivet when that material is pierced.

The invention may be described briefly as consisting of a rivet having a tubular post with an axially flattened tip of such dimensions that its thin edges project both axially and radially beyond the adjacent cylindrical surfaces of the post; an article such as a stud shell having a hollow neck with an inside diameter which is about equal to, or preferably, slightly less than the width of the tip of the rivet post along its flat sides so that, when the rivet post is telescoped within the neck of the shell with a supporting sheet positioned therebetween, the side edges of its tip will cut a pair of slits in that part of the sheet which is stretched over the sides of the post; and of a setting tool having a pointed mandrel which is adapted, during the telescoping operation just mentioned, first to perforate any part of the sheet which is stretched over the thin top edge of the tip, and then to split and roll, or otherwise upset, the rivet post to secure the parts together.

The full nature of the invention, along with other objects and various advantages thereof, will be more apparent from a consideration of the following description when read in connection with the accompanying drawing, in which, Figure 1 is a perspective view of a separable fastener stud assembly partly broken away to show the compression of the sheet material between appropriate flanges of the stud member and attaching rivet.

Figure 10:
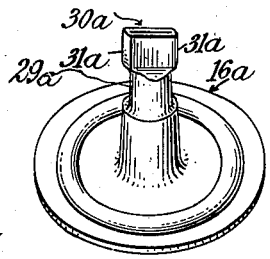
Figure 3:
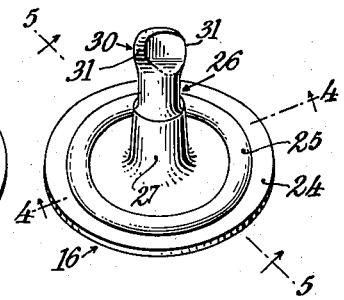
Fig. 3 is a perspective view of one form of attaching rivet constructed in accordance with the principles of the invention.
Figure 2:
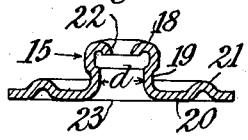
Fig. 2 is a sectional view of the stud shell member of Fig. 1.
Figure 4:
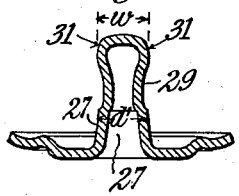
Figure 5:
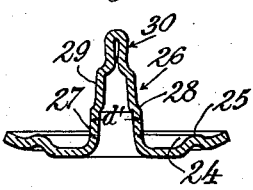
Figure 6:
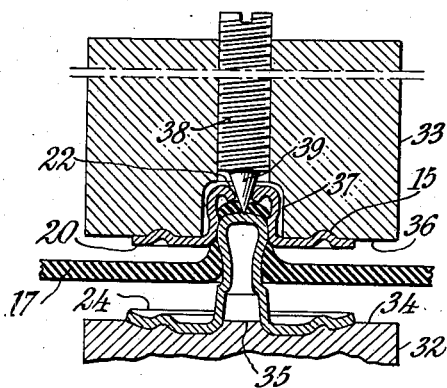
Figure 7:
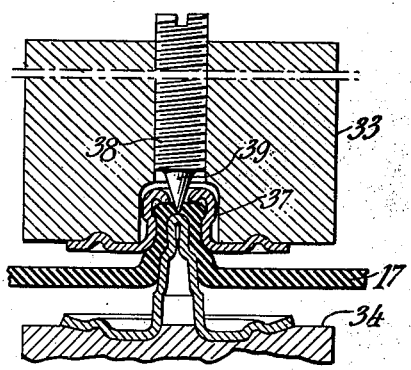
Figure 8:
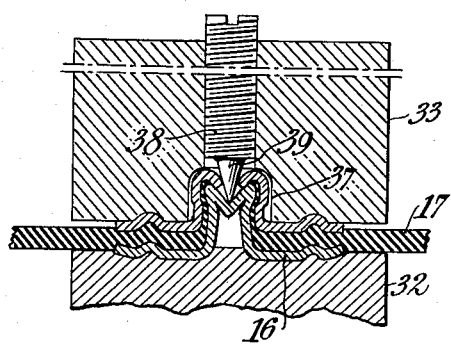
Figure 9:
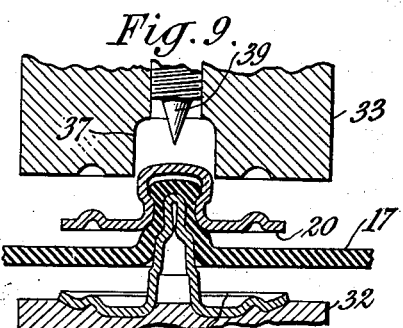

Figs. 4 and 5 are sectional views of the rivet of Fig. 3 taken respectively on the lines 4—4 and 5—5 of the latter figure;

Fig. 6 is an elevational view, in section, of the rivet of the present invention partially telescoped within the stud shell of Fig. 2 with a sheet of material positioned therebetween, an anvil for supporting the various constituent parts of the assembly, and a closing die having a pointed mandrel incorporated therein for completing the attaching operation, the section being so taken that the rivet appears in the position illustrated in Fig. 4;

Fig. 7 is a view similar to that of Fig. 6 except insofar as the section of the parts is taken on a line such that the rivet appears in a position similar to that of Fig. 5;

Fig. 8 is a sectional view illustrating the completing of the attachment of a stud member to its supporting sheet;

Fig. 9 is a view generally similar to that of Fig. 7 and differs therefrom only insofar as the stud member has an imperforate head, and the closing die has just begun its descent; and Fig. 10 is a perspective view illustrating a modified form of attaching rivet incorporating the principles of the invention.

Figure 1:
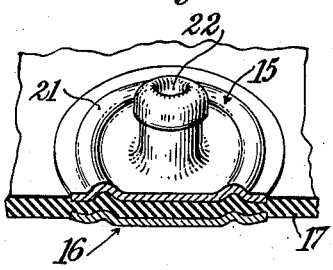

The improved assembly as illustrated in Figs. 1 and 8, consists of an article such as the stud shell 15 of Fig. 2 and an attaching rivet 16 constructed in the manner hereinafter defined, having concentric parts telescoped one within the other with an intervening sheet of rubber 17 compressed between their respective flanges.

The stud shell is of usual construction comprising, for example, a single piece of sheet metal which has been pressed, drawn, and otherwise mechanically worked to the shape shown—that is, so as to have a domed head 18 with a contracted neck 19 depending from its margins, and a substantially flat radial extension 20 adapted to serve as a base flange. The latter part may, if desired, have one or more peripheral beads 21 into which a part of the supporting sheet 17 may be compressed, as shown in Fig. 1.

In the preferred construction the head 18 is perforated as at 22 for the admission of a pointed setting tool during the attaching operation; and the base flange is flared outwardly from the foot of the neck on a curve—not a sharp break—so that the entranceway 23 to the stud may be slightly wider than the inside diameter $d$ of the contracted neck.

In one embodiment of the invention the rivet 16 is constructed as shown in Figs. 3, 4 and 5 where it may be seen to comprise a substantially flat base flange 24 having one or more peripheral beads 25, the entire flange being generally complemental to the flange 20 of the shell, and a centrally located, upstanding, tubular post 26. The lower-most part of the post, which, for convenience, will be termed the base section 27, is of generally conical proportions having an outside diameter $d'$ at its foot which is substantially equal to or slightly less than, the inside diameter $d$ of the contracted neck 19 of the shell; and an outside diameter at its top which is somewhat less than $d'$. At the top of the base section, and as indicated at 28, the post is sharply contracted so that the intermediate or "upper cylindrical" section 29 has an outside diameter which is considerably less than the inside diameter $d$ of the shell neck. The difference between these two diameters cannot be prescribed with exactness for it may vary to some extent. It can be said, however, that this part of the post, if continued upwardly at the same diameter, would fit loosely within the neck of the shell and leave some considerable space between the adjacent surfaces of the parts for the accommodation of the sheet material 17 (see Fig. 8).

In the preferred embodiment of Figs. 3, 4 and 5 the upper end of the post is imperforate and is collapsed, or flattened, so that its then contacting walls form a thin flat tip 30. For convenience, this tip may hereinafter be referred to as being "axially" flat or flattened. In such case it will be understood that it has been flattened in a direction transverse to the longitudinal axis of the post. In the flattening process, as is evident, the narrow edges of the tip will be forced outwardly beyond the adjacent cylindrical surfaces of the post to form a pair of diametrically opposite knife-like wings 31 (Figs. 3 and 4). The exact extent to which these wings protrude, again, cannot be defined with precision, but it can be said that the width $w$ of the completed tip, along its flat side, should be substantially equal to and preferably slightly greater than the inside diameter $d$ of the cooperating neck of the shell; and slightly less than that of the entrance 23 to that neck.

The dimensions of the various parts of the stud above referred to are all relative, that is, they are relative to each other, and particularly to the inside diameter $d$ of the cooperating shell neck 19. A better understanding thereof, and the reasons therefor, will be had from a consideration of the cooperation between the parts in a manner now to be described.

The operation wherein the stud element 15 is riveted to the supporting sheet of material 17 is illustrated particularly in Figs. 6, 7 and 8. Essentially that operation comprises the telescoping of the rivet post within the hollow head and neck of the shell, a puncturing of the intervening sheet 17 so that the post may protrude therethrough, and a rolling or upsetting of the tip of the post into the shell so as to secure the parts together and compress the surrounding portions of the sheet 17 between the cooperating flanges 20 and 24 of the separate elements.

In practice the assembling of the parts is usually carried out in an automatic machine of which only the essential die elements 32 and 33 are here illustrated. Briefly, the die 32 need be nothing more than an anvil having an upper face 34 which is complemental to the flange 24 of the rivet post, and a cylindrical central hub 35 adapted to enter the open end of the post and hold it in position. The upper or "closing die" 33 has a lower face 36 which is complemental to and adapted to engage the flange 20 of the shell, a central recess 37 capable of accommodating the domed head and contracted neck of that element, and an axially located mandrel 38 threaded into the body of the die so that the position of its pointed end 39 may be adjusted for purposes later to be considered.

After the member and rivet have been assembled on opposite sides of the sheet of material (which is here assumed to be rubber) in the manner shown, the die 33 is brought downwardly over the shell to telescope the hollow head of that element over the tip 30 of the rivet post, and to stretch the intervening part of the sheet of material over this flattened tip. When that happens, and as may be seen in Fig. 6, the protruding wings 31 act as knives and, cooperating with the adjacent surfaces of the neck, cut a pair of slits in that part of the intervening sheet which is stretched over these wings—not, however, that part which is stretched over the extreme end of the tip, nor that which lies in the space between the flat sides of the tip and the adjacent surfaces of the stud shell as may be seen in Fig. 7. Usually at this point, or slightly later in the process, the material lying on the thin top edge of the tip will break under its own tension thus allowing the surrounding parts to draw back along the flat sides and cylindrical parts of the post—and in effect, to allow the latter to protrude through a resulting hole in the material. If it does not break in this fashion, as occasionally occurs when the supporting sheet is fairly thick rubber, it will be so weakened by the slits, and the extreme tension imposed by the telescoping and slitting actions, that the desired result will immediately follow in the manner now to be considered.

Upon continuing the downward movement of the die 33, the point 39 of the mandrel will enter the opening 22 in the stud head, and first contacting the material which is stretched over the tip (if not already broken as above described) will puncture the latter and permit it to draw back along the flat sides of the tip and around the cylindrical part 29 of the post. Thereafter the mandrel will engage the imperforate tip, and, after splitting or otherwise upsetting it, will roll it to the position shown in Fig. 8, thus effecting substantially a perfect bond between the parts.

The attaching operation, then, may be summarized substantially as follows:—the tip of the rivet post, upon entering the hollow stud neck, stretches the intervening material to some considerable extent, and its wings, acting as knives against the anvil provided by the inner surfaces of the stud neck, cut a pair of slits in the stretched material which, normally, so weaken the uncut part as to cause it to break under the stress of its own tension. Complete and positive perforation of the sheet to permit the post to protrude therethrough is, however, in any event assured by the action of the pointed mandrel of the setting tool.

The rivet of Fig. 3 having a closed flattened tip is usually preferred, but the principles of the invention may be incorporated in other ways if desired. Fig. 10, for example, represents a modified form of the invention wherein the tip 30a is formed by flattening the open end of the cylindrical stud post of the rivet 16a, in the manner shown. When so flattened it will have, in effect, a thin knife-like upper edge, and a pair of wings 31a extending axially beyond the surfaces of its cylindrical portion 29a capable of serving the functions of the corresponding parts of the rivet 16 heretofore described. The manner in which this rivet is used to attach a stud shell to its supporting sheet is identical with that described in connection with the rivet of Fig. 3; and the attaching operation, too, is identical except insofar as the pointed setting tool does not, in this case, have to pierce the end of the rivet, but merely to roll, split, or otherwise upset it.

In all of the embodiments of the invention herein shown and described, the piercing of the supporting sheet is achieved by cooperation between the side edges of the rivet tip, and the side surfaces of the stud shell—not by a compression of the material between the top edge of the post and the underside of the device as has heretofore been the practice. Along this same line it may be noted that the sheet is usually fully pierced before it approaches the head of the shell, and is under such tension that when pricked by the point of the mandrel it can readily withdraw along the flat sides of the tip in the desired manner. In other words, the construction of the rivet is such as to provide not only for the slitting of the material, but also a path through which it may withdraw to a desired point. While the foregoing represents the usual result, it occasionally happens that some part of the sheet, though completely pierced, does not fully draw back around the sides as desired, but remains trapped within the shell head. Its effect upon the assembly has not, however, been found undesirable. Apparently the quantity is so small (only a very small amount can possibly be stretched over the thin upper edge of the flat tip), and the splitting or upsetting of the rivet is such that the trapped material intermingles with the mutilated part thereof, expands, and tends to form a bond between rivet and the shell.

Since certain changes may be made in the constructions without in any way departing from the true scope of the invention, it is intended that the foregoing shall be construed in a descriptive rather than a limiting sense.

What I claim is:

1. An attaching rivet or the like, of the character described, comprising a radially disposed base having a centrally located, upstanding, hollow, post of generally cylindrical form terminating in a blunt tip which is flattened in a direction transverse to the longitudinal axis of the post with its side edges projecting radially beyond the adjacent cylindrical surface of the post at two diametrically opposite points.

2. A separable fastener element assembly comprising a stud shell, and an attaching rivet telescoped one within the other with a portion of sheet material compressed between them; the stud shell comprising a single piece of sheet metal having a hollow domed head with a tubular contracted neck depending therefrom and a substantially flat radial extension from the foot of the neck serving as a base; and the rivet comprising a substantially flat radially disposed flange for cooperation with base of the shell, and a central tubular post extending perpendicularly from the flange having an upper cylindrical part with an outside diameter which is somewhat less than the inside diameter of the shell neck so as to leave a space therebetween for the accommodation of parts of an intervening sheet of material, and a closed, axially flat, tip with a width substantially equal to the inside dimension of the contracted shell neck so that its opposite edges project beyond the adjacent cylindrical surfaces of the post, and when telescoped in the neck, engage and tear a pair of slits in the intervening sheet of material.

3. A separable fastener element assembly comprising a stud shell and an attaching rivet telescoped one within the other with a portion of sheet material compressed between them; the stud shell comprising a single piece of sheet metal having a hollow domed head with a tubular contracted neck depending therefrom and a substantially flat radial extension from the foot of the neck serving as a base; and the rivet comprising a tubular post having a collapsed tip with a width substantially equal to the inside diameter of the neck of the shell, an immediately depending substantially cylindrical part with an outside diameter which is less than that of the inside of the shell neck so as to leave a space for the accommodation of a part of the intervening sheet, a base section flaring outwardly from the bottom of the cylindrical part so that its diameter at its foot is only slightly less than that of the shell neck, and a substantially flat flange extending radially from the foot of the base section for cooperation with the flange of the shell.

4. A self-piercing rivet for use in attaching a complemental member to an intervening supporting sheet comprising a radially disposed base flange, and a central upstanding tubular post of substantially cylindrical form having an axially flat portion adjacent its upper end, such flat portion having thin side edges which project beyond the adjacent cylindrical surface of the post for such distance as to be capable of cooperating with inner surfaces of a cylindrical part of the complemental member when the post is telescoped therewithin, to tear an intervening sheet of supporting material so that the post may protrude through the resulting opening in such sheet.

5. A self-piercing rivet for cooperation with a hollow stud shell, comprising a substantially radially disposed base flange, and an upstanding tubular post having a blunt tip which is flat in a direction transverse to the longitudinal axis of the post with its thin side edges projecting radially beyond the adjacent surfaces of the post for such distance that they may cooperate with the inner side surfaces of a hollow stud shell, when the rivet post is telescoped therein, to tear an intervening sheet of material so that the post may protrude through the resulting opening in the sheet.

6. An assembly comprising a member and an attaching rivet adapted to cooperate with the member with a sheet of supporting material compressed between them; said member comprising a radial flange disposed on one side of the sheet and having a circular opening therein for the reception of a part of the rivet; and said rivet comprising a radial flange disposed on the other side of the sheet for cooperation with the flange of the member, and a tubular post extending perpendicularly from the flange, said post having a blunt axially flat tip with thin side edges which project beyond the adjacent surfaces of the post for such distance as to be capable of cooperating with surfaces defining the opening in the member, when the post is passed through that opening, to tear the intervening sheet material so that the post may protrude through the resulting opening in the sheet.

7. An assembly according to claim 6, further characterized in that the post of the rivet has an upper portion of substantially circular cross-section with a diameter which is less than that of the opening in the member; in that the width of the flat tip of the post is substantially equal to the diameter of the opening in the member.

8. A snap fastener stud assembly comprising a stud shell, and an attaching rivet having parts telescoped one within the other with a portion of sheet material disposed between them; the stud shell comprising a hollow domed head with a tubular contracted neck depending therefrom and a radial flange extending from the foot of the neck and adapted to engage one side of the supporting sheet; and the rivet comprising a radial flange adapted to engage the other side of the sheet and to cooperate with the flange of the stud shell, and a tubular post of substantially cylindrical form extending perpendicularly from the flange, said post having an axially flattened portion adjacent its upper free end with this side edges which project beyond the adjacent cylindrical surfaces of the post, the diameter of such flattened portion being substantially equal to the inside diameter of the contracted neck of the stud whereby such wings may cooperate with the inner side surfaces of the neck of the stud, when the post is telescoped therewith, to tear the intervening sheet material so that the post may protrude therethrough.

JEFFERY J. VEILLETTE.